Aug. 26, 1947. E. M. DELORAINE ET AL 2,426,183
REFLECTED WAVE DIRECTION FINDER
Filed June 3, 1943 3 Sheets-Sheet 1
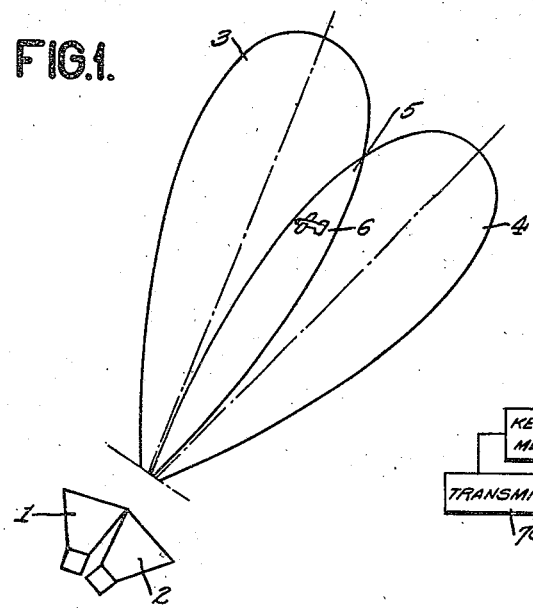
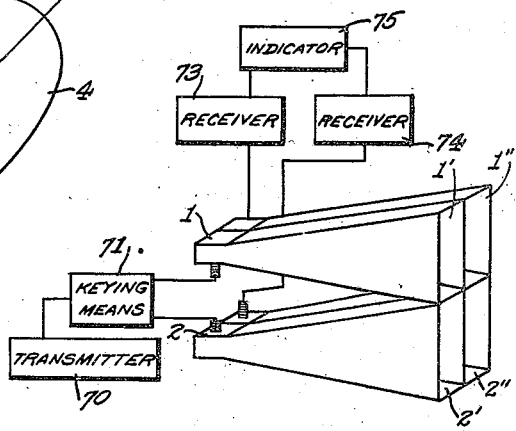
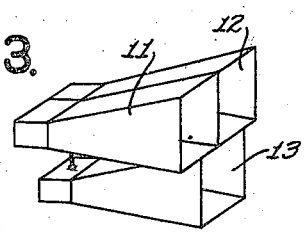
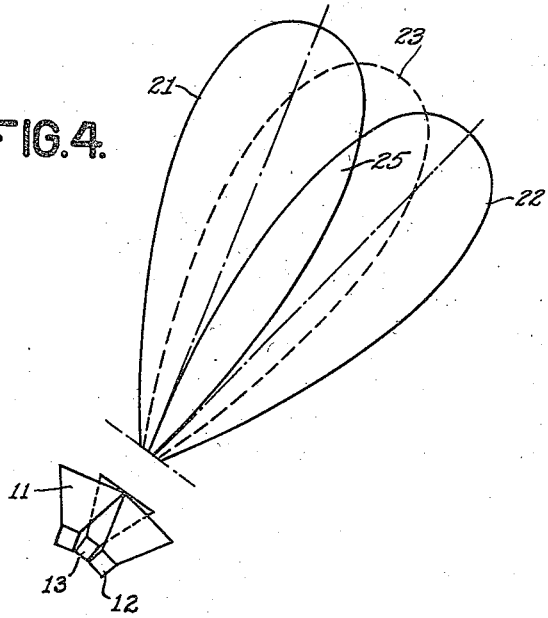
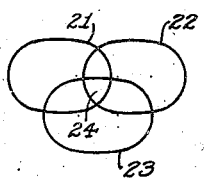
EDMOND M. DELORAINE
EMILE LABIN
HENRI G. BUSIGNIES
INVENTORS
BY Edward D. Kenney
ATTORNEY

EDMOND M. DELORAINE
EMILE LABIN
HENRI G. BUSIGNIES
INVENTORS

Patented Aug. 26, 1947

2,426,183

UNITED STATES PATENT OFFICE 2,426,183

REFLECTED WAVE DIRECTION FINDER

Edmond M. Deloraine and Emile Labin, New York, and Henri G. Busignies, Forest Hills, N. Y., assignors to International Standard Electric Corporation, New York, N. Y., a corporation of Delaware Application June 3, 1943, Serial No. 489,468
In France April 4, 1940

6 Claims. (Cl. 250—1.72)

1

The present invention concerns systems for detecting obstacles or other reflecting bodies utilizing electromagnetic waves and controlling apparatus associated with such systems.

The invention concerns more particularly, systems for the detection of aircraft by electromagnetic waves combined with apparatus for controlling gunfire.

According to certain features of the invention, radiation patterns, overlapping in a particular manner, are created in space by means of several transmitters arranged in a group. This group is movable as a unit in such a manner that the patterns of the group remain in the same relative positions with respect to each other at all times in spite of displacement of the group, so that the beams or patterns may be focussed on an aircraft. Preferably, the patterns are moved so that the aircraft is within the area of overlap of the patterns. Reflected signals from the body or bodies to be detected are received at a point near the transmitters so that the position of the body may be determined. Other apparatus which furnishes, for example, an indication of geographic north and the horizontal may be associated with the groups to indicate the position of the groups with respect to fixed co-ordinates. The position of the groups with respect to these co-ordinates may be automatically transmitted by remote control apparatus to an anti-aircraft battery associated with the detecting post.

According to a further feature of the invention a plurality of groups of transmitters and receivers, each of which is movable as a unit, are mounted at substantially the same place. The groups are mounted to be movable together in one direction while being separately movable in another direction.

According to another aspect of the invention, these overlapping patterns of electro-magnetic waves are produced preferably by means of electromagnetic horns of a known type which produce very uniform beams of high frequency energy having the desired directivity. However, the invention is not limited to this type of antenna but can utilize all antennas capable of producing similar characteristics of directivity and uniformity of radiation. These horns can be double, that is, consisting of two portions each, an emitter portion and a receiver portion, or can be constituted by a single horn which is alternately an emitter or receiver by means of keying.

In one example of the invention, two horns are associated with each other for furnishing two radiation patterns in a single plane, the patterns

2 overlapping in a relatively narrow part of space. Means for orienting these horns is provided for adjusting the overlapping according to the electro-magnetic exploring pattern desired. In another embodiment, three simple horns, or double horns, are associated for furnishing three patterns in a single plane, each pattern being superposed upon the other in a portion of space. The emitted patterns in a single plane differ from each other due to their keying, their modulation, or their frequency, the comparison or the determination of the reception characteristics of the radiation reflected by the air-craft permitting the determination of its position in the overlapping patterns, and particularly, the direction and the elevation. The integrated indications are then transmitted to one or more batteries or anti-aircraft pieces directly from the integrating apparatus, the apparatus being actuated by the operator who controls the displacement of the electromagnetic horn at the detecting post.

Several embodiments of the invention will be described in detail in the following description, given in connection with the attached drawings, wherein:

Fig. 1 represents schematically two electromagnetic horns and their radiation patterns;

Fig. 2 represents in perspective, groups of two electromagnetic horns of the type shown in Fig. 1;

Fig. 3 represents a view in perspective of a group of three electromagnetic horns;

Fig. 4 shows the three horns of Fig. 3 and their radiation patterns in plan views;

Fig. 5 is a cross-section of the patterns of Fig. 4;

Figure 6:
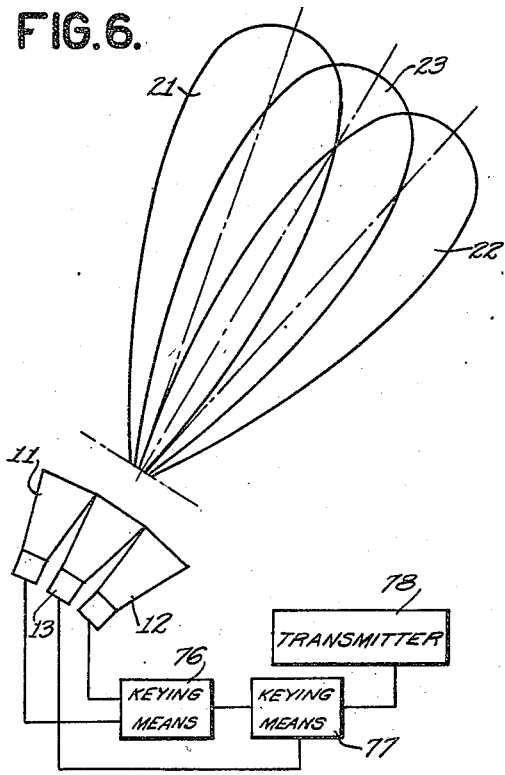
Figure 8:
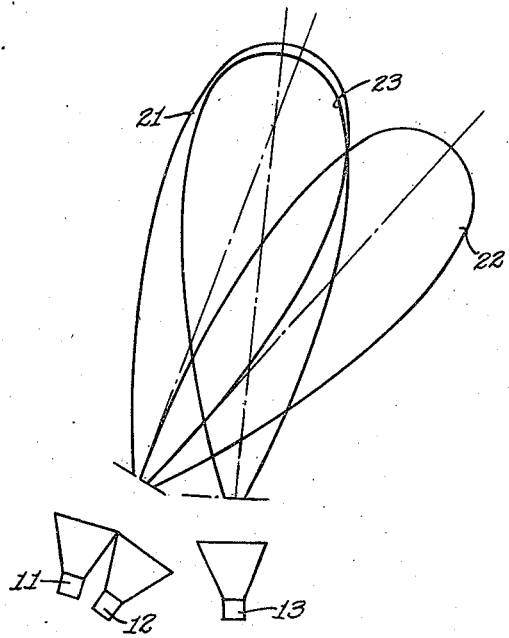
Figure 7:
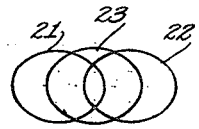
Figure 9:
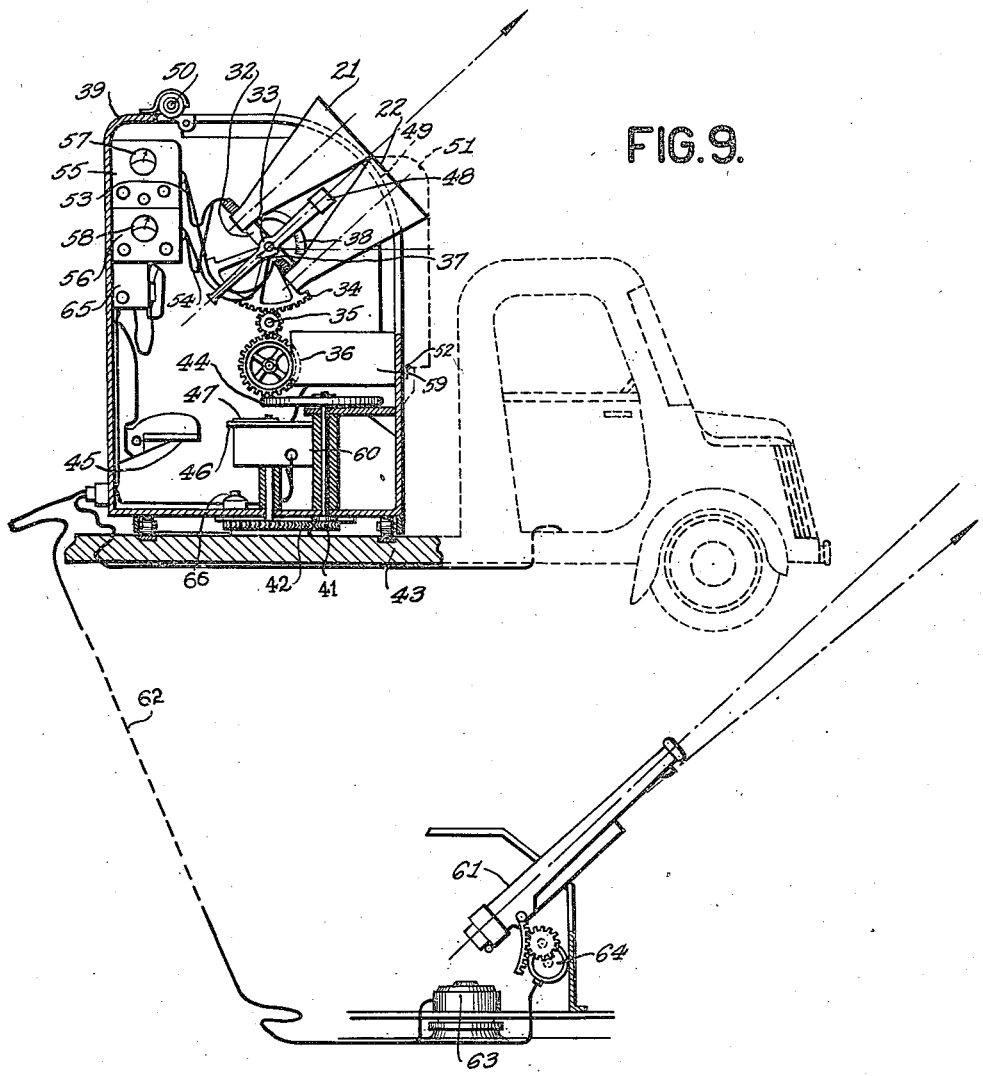
Figure 10:
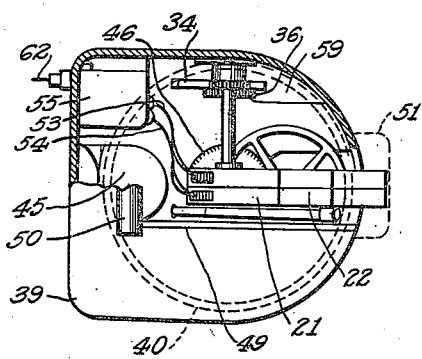

Figs. 6, 7, and 8 show two possible modifications of the arrangement of Figs. 3, 4 and 5;

Fig. 9 represents an embodiment of a detecting post associated with an anti-aircraft battery and employing the system of horns of Figs. 1 and 2;

Fig. 10 represents a plan view of the detecting post of Fig. 9.

In Fig. 1 is illustrated schematically, an arrangement of two electromagnetic horns, 1 and 2, which, when excited by any known means, give two patterns, 3 and 4, which partially overlap each other at 5. This overlapping is produced by suitably placing the horns and their exciting radiators, that is to say, by their relative dimensions in relation to the type of wave and to the utilized wave length and by the relative position of the exciting radiator to the interior of the horn. Such apparatus giving a beam or beams of high frequency energy having a desired form and length, is well known in itself, and will not be described in detail in the present application. The beams or rays 3 and 4, are, for example, radiated by the portions 1' and 2' of the horns 1 and 2, shown in Fig. 2, in perspective. The portions 1' and 2' are fed from the transmitter 70 through keying means 71, which impress complementary signals on the energy fed to the horns. The portions 1'' and 2'' of the horns serve to receive the reflected energy from a vehicle, such as an aircraft, for example, at position 6 in Fig. 1. This energy is fed from the portions 1'' and 2'' to the receivers 73 and 74 which, in turn, operate indicator 75. This aircraft is represented at 6 within the portion of space where the two pencils 3 and 4 overlap or superpose, for one of the features of the invention consists in displacing the group of two horns 1 and 2 as a unit in such a manner that the aircraft detected by the reflected waves in one or the other of the patterns 3 and 4 is found by orienting the horns so that the aircraft is located within portion 5. If each pattern is distinguished from the other, for example, by modulation either by keying the patterns, by complementary signals, as shown, or by impressing signals of different frequency thereon, energy reflected from the aircraft will be received at 1'', 2'' and the modulation, or the frequency of the reflected energy will determine in which portion of the total radiation pattern the aircraft is located.

For example, suppose that the indicator is a headphone and the beam 3 is modulated by dots and the beam 4 is modulated by dashes. When the aircraft is in portion 3, the dot modulated signal will predominate and dots will be heard predominantly in the headphone. Similarly when the aircraft is in portion 4, dashes will predominate. When the aircraft is in portion 5, a continuous signal will be heard. For determining with greater precision the direction and the altitude of the aircraft, it is then convenient to displace the beams in such a manner that the aircraft finds itself in the region 5 wherein it reflects simultaneously the waves presented by the two patterns 3 and 4. For example, if the beam 3 is keyed with dots and the beam 4 with dashes, the reception of a continuous dash at the receivers indicates that the aircraft is in the narrow region 5. The orientation of the horns then determines the direction and the elevation of the aircraft. The direction of altitude of the aircraft can also be determined by varying the amount of energy supplied to one of the horns or by varying the wave length of the energy insead of orienting the horns. In this manner the strength or shape of the radiation patterns is varied, and hence the direction of the overlapping portion is varied. In the preferred embodiment of the invention, I provide beams which are different from each other by frequency, by modulation or by keying, but if desired, the beams may be the same, and the aircraft position may be obtained by noting the difference in the magnitude of the reflected energy when the aircraft is in the overlapping portion. The beams from the two horns 1, 2 of Fig. 1 are of course club shaped and their overlapping portions define a roughly cigar-shaped zone in space of relatively small cross-sectional area, as indicated, for example, by the overlapping beams 21, 22 of Fig. 5. The radiaton patterns in the plane at right angles to the plane of the overlapping patterns shown in Fig. 1 will be sharp and thus signals will only be received when the aircraft is in either one or both of the beams. When, therefore, energy is received which is indicative of the combined characteristics of the two beams the inclination and azimuth of the horns will determine both the direction and elevation of the aircraft.

In the preceding description of Figs. 1 and 2, it has been supposed that the portion 1' and 2' of the horns were emitter portions, Fig. 1 showing a side view of the radiation patterns and of the horns. The inclination and the azimuth of the group of horns is that of the direction and the elevation of the aircraft when the energy reflected by the aircraft presents the combined characteristics of the two patterns, that is to say, when the aircraft finds itself, for example, at 6 in Fig. 1, within the region 5 of the superposed beams. Therefore, it is clear that the emitter portions could be 1' and 1'', and the receiver portions 2' and 2'', the showing of Fig. 1 in this latter case being a plan view. The same indications of elevation and direction could evidently be obtained. Similarly, other combinations of the portions 1', 1'', 2' and 2'' of the horns could be utilized for obtaining the desired result.

It should also be noted that the resultant effect could be the same if the horns, instead of each being divided into an emitter portion and a receiver portion, were alternately an emitter and a receiver. This is equally true for the apparatus which is described below.

In order to have a greater precision in the indication of elevation and of direction obtained, it is advantageous to employ an additional electromagnetic horn, which may be arranged in a fixed manner, or may be arranged in an adjustable manner with the two horns above mentioned.

In Fig. 3, for example, two horns 11 and 12 are disposed side by side in a manner to produce the radiation patterns 21 and 22 (Fig. 4) overlapping each other. These two horns 11 and 12 can be, for example, similar to the horns 1 and 2 of Fig. 1, and placed beside one another parallel to a horizontal plane. A third horn 13, indicated in dotted lines in Fig. 4 and in full lines in the perspective view of Fig. 3, may be placed below the horns 11 and 12 in symmetrical relation with respect to these horns. The shape of the beam radiated by this third horn is also shown by the dash line at 23 in Fig. 4. As will be see in Fig. 4 and more clearly by the cross section in a plane perpendicular to the axis of the group shown in Fig. 5, the three beams are superposed in a region of space 24. They are disposed in a manner such that the region 24 may be narrower in relation to the region 25 where the patterns 22 and 21 of the beams emitted by the two horizontal horns 11 and 12 overlap.

The three beams can be disposed according to an embodiment of the invention to present distinctive characteristics. For example, each beam may be emitted with a particular frequency, with modulations of different frequency or of different keying in order that a reception of the wave energy reflected from an aircraft furnishes an indication of its position with respect to said beams. This reception can conveniently be automatic, for example, the energy reflected from each of the pencils can be received independently for actuating relays which cause the indicators to function. The combination of these indicators (optical, for example) indicate in which region of space at the interior of the beam system the aircraft is located. The group of three horns may then be maneuvered or alternatively the two higher horns then the lower horn may be maneuvered to approximately locate the aircraft and to modify the direction and the inclination of the beams in order to subject the vehicle to energy of the three beams. When reflected energy received from the vehicle contains components of all three beams, the position of the horns defines the direction and the elevation of the aircraft in a precise manner. By the independent control of the third horn, one can obtain a very precise indication of the altitude of the aircraft. Because the radiation from electromagnetic horns may be made to form a sharp beam and thus produce a precise indication, the electromagnetic horns present an advantage over other antennas giving directive beams utilized for detecting methods.

Fig. 6 represents another possible arrangement of the three horns, all three being placed side by side parallel to a horizontal plane. Fig. 7 shows a cross section in a plane perpendicular to the axis of the beams, the definite regions produced by the beams of Fig. 6. The horns and the beams of Figs. 6 and 7 carry the same reference numerals as those of Figs. 3 to 5.

Fig. 8 represents another example of the arrangement again with three horns. In this arrangement the third horn 13 is appreciably separated from the two other horns and can be controlled independently for radiating a beam, the shape of which is indicated at 23, cutting the beams shown at 21 and 22. The third beam may, for example, be used for finding the altitude of an aircraft detected by means of the horns 11 and 12, or also for getting a more precise indication of the direction and elevation of the aircraft, all three simultaneously permitting the observation of altitude.

Whatever may be the arrangement of the three horns adopted, being similar or different from the arrangements indicated in Figs. 3, 6, or 8, the three patterns should have, as mentioned above, characteristics different in frequency, in modulation or in keying. A preferred arrangement of the invention for providing different radiation pattern characteristics is shown in Fig. 6 and comprises keying apparatus 76 which keys the output of transmitter 78 and hence, two of the beams, for example, the beams 21 and 22, by means of complementary signals, that is to say, signals whereby a continuous signal is produced in the portion defined by the overlapped beams. Such an arrangement is well known for instrument landing systems, and will not be described here in more detail. The group of the two beams is then keyed in another rhythm by keying apparatus 77, for example, much more slowly, and the third beam 23 is keyed at the same slower rhythm with a signal complementary to the slower signal applied to beams 21 and 22. With such a method of keying, the energy reflected from the aircraft is received in the form of a continuous signal when the aircraft is found in the region of space 24 where the three beams are superposed. This manner of keying can be applied at the beginning of the search for aircraft or after the first detection of aircraft by means of the first two beams only. The beam providing the pattern 23 can in the latter be put in service after the first detection. With all the arrangements one can combine at the detecting post direct and automatic indications of the aircraft position.

The beams may also be pulse modulated in accordance with the methods disclosed in United States applications Serial Nos. 231,186 and 381,640, filed September 22, 1938, and March 4, 1941, respectively, and assigned to the present assignee. In these applications arrangements are described wherein a series of pulses are transmitted toward an object. The pulses are reflected by the object and the time taken for the pulses to leave the transmitter, be reflected and return to a receiver at the transmitting station gives an indication of the distance of the object from the transmitting station.

An example of a detecting post incorporating a feature of the invention is shown in Figs. 9 and 10. This embodiment employs the horn apparatus of Figs. 1 and 2, but it should be understood that it could easily be modified for using any one of the other horn apparatus described in the present application.

In these figures a detecting post is shown mounted on a truck and comprises horns 21 and 22 fixed relative to each other. These horns are carried by a frame 32, pivoted at 33, and provided with a toothed sector 34, engaged with a gear 35 and moved by intermediate gears (not shown) and a wheel 36. A pointer 37 on the frame 32 moves in front of a graduated dial 38 which may be graduated in thousandths used in artillery fire for the amount of elevation required for a given range. The pointer 37 is related to the group of horns 21 and 22 in a manner to follow their inclination.

The equipment of the detecting post is mounted in the interior of the cabin 39 which may be pivoted around a vertical axis being displaced along a rotation rail 40 by means of a pinion 41 engaged with a tooth wheel 42 solidly mounted on the base or platform 43 of the post, for example, the platform of a truck or railroad car. The pinion 41 is controlled by means of wheel 44 by the operator of the detecting post. A seat for the operator is represented at 45. Direction is found by the operator by means of a dial 46 solidly mounted on the cabin and displaced under a pointer 47 solidly mounted on the platform 42.

In this manner, the operator can make the orientation of the cabin 39 vary in all of the azimuths by means of the wheel 44 at the same time making the two electromagnetic horns vary in inclination by means of the wheel 36 which permit a complete search of space for the detection of aircraft susceptible of reflecting the electromagnetic energy radiated, the search being conducted in the manner currently employed in the methods of acoustically guiding aircraft. The search may also be made electrically especially when other types of radiators are employed. A telescope 48 can be attached to the horn system for permitting adjustment or for completing the electromagnetic observation by a visual observation.

The showing of the horns 21 and 22 is such that may project from the cabin 39 in order to eliminate parasitic effects. For this purpose the horns pass through openings 49 which can, when the post is not in use be closed by a flexible and slidable window in a receptacle 50 being adapted to the exterior contour of the cabin 39. A cover 51 pivoted at 52 can be used to completely enclose the horn, this arrangement ensuring the protection of the post against bad weather. In a modification the inside wall of the cabin in front of the horn can be closed, and, in this case, the wall of the cabin may consist of a substance having no appreciable effect on the propagation of the electromagnetic waves.

The horns 21 and 22 are connected by the flexible connection 53 and 54 to the transmitter 55 and to the receiver 56. On the faces of the transmitter 55 and of the receiver 56 turned toward the operator are placed measuring apparatus 57 and 58 which may be of the conventional type employed in blind landing systems. This apparatus is disposed in such a manner that it can be easily read by the operator and so that he is permitted to control in turn the action of the transmitter on the apparatus 57 and the appearance of the reflected signal on the apparatus 58 when an aircraft enters a region in space in which beams are emitted by the horns. Although I have shown a single apparatus 58 in the drawing, it will be understood that other individual indicating apparatus such as cathode ray tubes may be provided when it is necessary for the detection of aircraft. Audible signals can also be received by the operator by means of a telephone headpiece or loudspeaker, not shown.

Integrating apparatus of a known type 59 and 60 are associated with the pointer 37 and with the dial 46 respectively. This apparatus for integrating is connected electrically to the controlling apparatus of the anti-aircraft piece 61 by a flexible cable connection 62. This apparatus which corrects the drift, calculates the probable route of the aircraft, etc., by methods well known in artillery practice, can be inserted between the connecting cable 62 and the said controlling apparatus. This controlling apparatus and correcting apparatus does not form a part of the present invention and is therefore not shown in detail. As an example of the controlling apparatus, the motor 63 and 64 has been shown for the case of an automatic response of the anti-aircraft piece to the operator at the detecting post.

A telephone 65 is further provided in the cabin for permitting eventual communication of the observations to the piece 61.

Although the indications of elevation and direction are continuously integrated and transmitted to the anti-aircraft piece, the piece may be arranged to be fired only when the observer at the post sends the proper signal to the piece, for example, by pressing a pedal 66 connected to wires in the cable 62 which in turn connect to a lamp of the apparatus of the antiaircraft piece station.

Although the invention has been described in the case of certain particular embodiments, it is clear that it is not limited only to these embodiments, but is, to the contrary, susceptible to numerous modifications and adaptations without departing from the scope of the invention.

What we claim is:

1. A method of determining the direction and elevation of an object in space by reflection of electromagnetic energy therefrom which comprises producing two beams of electromagnetic energy having overlapping portions, searching with said beams until an object is found with the overlapping portions, producing a third beam of electromagnetic energy which overlaps the overlapping portions of said two beams, directing said beams generally toward said object and separately orienting one of said beams until said object is within the portion at which all three beams overlap.

2. A method according to claim 1 further comprising giving to each beam a distinctive signal characteristic.

3. An object detecting system for detecting the position of a reflecting object, comprising means for producing a first beam of electromagnetic energy, means for producing a second beam of electromagnetic energy, said beams overlapping each other to define a predetermined double portion, means for producing a third beam of electromagnetic energy overlapping said portion, means for modulating the energy in said first beam with a first signal, means for modulating the energy in said second beam with a second signal complementary to said first signal, means for modulating the energy in said first and second beams with a third signal, means for modulating said third beam with a fourth signal complementary to said third signal, means for directing said overlapping portion toward said object, means for receiving energy of each beam reflected from said object, and means for comparing the energy reflected from each beam by said object, to determine the alignment of said beams with respect to said object.

4. An object detecting system for detecting the position of a reflecting object, comprising means for producing a first beam of electromagnetic energy, means for producing a second beam of electromagnetic energy, said beams overlapping each other to define a predetermined double portion, means for producing a third beam of electromagnetic energy overlapping said portion, said means for producing said beams each comprising an electromagnetic horn, the horn used for producing said third beam being mounted below the horns used for producing said first and second beams, means including at least one of said horns for directing said overlapping portion toward said object, means for receiving energy of each beam reflected from said object, and means for comparing the energy reflected from each beam by said object, to determine the alignment of said beams with respect to said object.

5. An object detecting system for detecting the position of a reflecting object comprising means for producing a first beam of electromagnetic energy, means for producing a second beam of electromagnetic energy, said beams overlapping each other to define a predetermined double portion, means for producing a third beam of electromagnetic energy overlapping said portion, said means for producing said beams comprising electromagnetic horns, the horn used for producing said third beam being mounted between the horns used for producing said first and second beams, means including at least one of said horns for directing said overlapping portion toward said object, means for receiving energy of each beam reflected from said object, and means for comparing the energy reflected from each beam by said object, to determine the alignment of said beams with respect to said object.

6. An object detecting system for detecting the position of a reflecting object comprising means for producing a first beam of electromagnetic energy, means for producing a second beam of electromagnetic energy, said beams overlapping each other to define a predetermined double portion, means for producing a third beam of electromagnetic energy overlapping said portion, said means for producing said beams comprising electromagnetic horns, the horn used for producing said third beam being mounted beside the horns used for producing said first and second beams, means including at least one of said horns for directing said overlapping portion toward said object, means for receiving energy of each beam reflected from said object, and means tor comparing the energy reflected from each beam by said object, to determine the alignment of said beams with respect to said object.

EDMOND M. DELORAINE.
EMILE LABIN.
HENRI G. BUSIGNIES.

REFERENCES CITED

The following references are of record in the file of this patent:

UNITED STATES PATENTS

| Number | Name | Date |
|---|---|---|
| 2,176,469 | Moueix | Oct. 17, 1939 |
| 1,867,264 | Hyland | July 12, 1932 |
| 2,038,873 | Purington | Apr. 28, 1936 |
| 2,271,534 | Bailey | Feb. 3, 1942 |
| 2,307,023 | Cooke et al. | Jan. 5, 1943 |

FOREIGN PATENTS

| Number | Country | Date |
|---|---|---|
| 457,176 | Great Britain | Nov. 23, 1936 |